US007152146B2

(12) United States Patent
Satoyama et al.

(10) Patent No.: US 7,152,146 B2
(45) Date of Patent: Dec. 19, 2006

(54) CONTROL OF MULTIPLE GROUPS OF NETWORK-CONNECTED STORAGE DEVICES

(75) Inventors: Ai Satoyama, Sagamihara (JP); Yasutomo Yamamoto, Sagamihara (JP); Yoshiaki Eguchi, Machida (JP); Hiroshi Ohno, Odawara (JP)

(73) Assignee: Hitachi, Ltd., Tokyo (JP)

( * ) Notice: Subject to any disclaimer, the term of this patent is extended or adjusted under 35 U.S.C. 154(b) by 489 days.

(21) Appl. No.: 10/649,766

(22) Filed: Aug. 28, 2003

(65) Prior Publication Data

US 2004/0268069 A1    Dec. 30, 2004

(30) Foreign Application Priority Data

Jun. 24, 2003  (JP)  ............................. 2003-178879

(51) Int. Cl.
*G06F 12/16* (2006.01)

(52) U.S. Cl. ............................. 711/162; 714/4; 714/5; 714/6; 714/7; 714/8; 709/214; 709/218

(58) Field of Classification Search ...................... None
See application file for complete search history.

(56) References Cited

U.S. PATENT DOCUMENTS 5,434,992 A    7/1995  Mattson

| 6,643,667 | B1 | 11/2003 | Arai et al. |
| 6,763,436 | B1 | 7/2004 | Gabber et al. |
| 2001/0034795 | A1 | 10/2001 | Moulton et al. |
| 2002/0069334 | A1* | 6/2002 | Hsia et al. ................... 711/147 |
| 2003/0204597 | A1 | 10/2003 | Arakawa et al. |
| 2004/0024796 | A1 | 2/2004 | Takeda et al. |
| 2004/0181641 | A1 | 9/2004 | Nguyen et al. |
| 2004/0199618 | A1* | 10/2004 | Knight et al. ................ 709/223 |

FOREIGN PATENT DOCUMENTS

JP    10-301720    11/1998

* cited by examiner

*Primary Examiner*—B. James Peikari
(74) *Attorney, Agent, or Firm*—Mattingly, Stanger, Malur & Brundidge, P.C.

(57)    ABSTRACT

In a storage system comprising multiple storage devices with different interfaces, the characteristics, including the type of interface, of the storage devices on which the source volume is constructed are checked, a volume having the characteristics that match them is selected as the destination volume, and the contents of the source volume are automatically replicated into the destination volume. Candidates for replication (destination) volumes are automatically selected and presented to the user or the administrator, and replication volumes are automatically allocated, without requiring the user or the system administrator to be concerned with the characteristics of the storage devices.

8 Claims, 8 Drawing Sheets

FIG. 2

| STORAGE DEVICE NO. | STORAGE DEVICE TYPE | ARRAY CONFIGURATION | USE | OPERATING STATUS |
|---|---|---|---|---|
| 0 | FC | (1) RAID5 | DB | ON |
| 1 | FC | (1) RAID5 | DB | ON |
| 2 | FC | (1) RAID5 | DB | ON |
| 3 | ATA | (2) RAID5 | FS | ON |
| 4 | ATA | (2) RAID5 | FS | ON |
| 5 | ATA | (2) RAID5 | FS | ON |

| LU NO. | HOST ALLOCATED | LUN | CAPACITY | LU TYPE | PAIRED LU NO. |
|---|---|---|---|---|---|
| 0 | YES | 1 | 50GB | FC | 20, 158 |
| 1 | NO | – | 50GB | FC | |
| 2 | YES | 1 | 50GB | ATA | 478, 1592 |
| 3 | NO | – | 50GB | ATA | |

| LU PAIR NO. | MAIN LU NO. | SUB-LU NO. | PAIRING STATUS |
|---|---|---|---|
| 0 | 100 | 200 | PAIRED |
| 1 | 110 | 210 | PAIRED |
| 2 | 120 | 220 | SPLIT |
| 3 | 130 | 230 | PAIRED |
| 4 | 140 | 240 | SPLIT |

| CACHE GROUP ID | CGrp0 | CGrp1 | ... |
|---|---|---|---|
| ALLOCATED CAPACITY | 1024MB | 2048MB | ... |
| LU ID | LU 0, LU 2, LU 3, ... | LU 1 | ... |

461
462
463

CACHE GROUP INFORMATION TABLE

| PORT ID | WWN | LUN | CAPACITY | MAPPED LUN |
|---|---|---|---|---|
| 010001 | ad00bfz0afd | 5 | 5120KB | 3B:20 |

| PRIORITY | CHARACTERISTIC | |
|---|---|---|
| 1 | HARD DISK TYPE | |
| 2 | CACHE DIVISION UNIT | |
| 3 | STORAGE SYSTEM NO. | 1st STORAGE SYSTEM |

FIG. 11

| SELECTION CRITERION | SELECTION ALGORITHM |
|---|---|
| RELIABILITY | SELECT AN FC STORAGE DEVICE |
| BACKUP | SELECT AN ATA STORAGE DEVICE IF IT IS FOR BACKUP PURPOSES AND THE NUMBER OF COPIES IS 6 OR MORE; SELECT A STORAGE DEVICE OF THE SAME TYPE AS THE SOURCE LU IF THE NUMBER OF COPIES IS LESS THAN 6 |
| USE: DB | SELECT AN FC STORAGE DEVICE |
| PERFORMANCE | SELECT AN FC STORAGE DEVICE HAVING THE SAME CACHE DIVISION UNIT |
| PRICE | SELECT AN ATA STORAGE DEVICE |

CONTROL OF MULTIPLE GROUPS OF NETWORK-CONNECTED STORAGE DEVICES

BACKGROUND OF THE INVENTION

The present invention relates to a storage system, and more specifically, to a storage system where the volume into which data is to be replicated can be selected.

In recent years, demand is increasing for shortening the time needed to replicate data stored in a storage device in a corporate storage system into another storage device for backup. This is primarily because less and less time is allocated for backup operation as the main corporate operation is getting longer, whereas more and more time is required to back up an increasing amount of data. To cope with such situations, an increasing number of companies have started using an arrangement where data to be backed up is replicated in a separate storage area or storage device. In such an arrangement, the data to be backed up is taken from the second storage area or storage device, while the main job stream continues using the first (original) storage area or storage device, so that the backup operation does not interfere with the main job stream.

Various interfaces are employed to connect a storage device to different pieces of computer equipment. Thus a storage device may be equipped with a Fibre Channel interface, the standardization of which is being promoted by the ANSI T11 committee (hereinafter called "FC storage device"), or with an AT Attachment (ATA) interface, the standardization of which is being promoted by the ANSI T13 committee (hereinafter called "ATA storage device").

ATA storage devices are relatively inexpensive and are primarily used in desktop personal computers for home use. In contrast, FC storage devices are primarily used in corporate server systems since they have higher data input/output (I/O) performance than ATA storage devices and are reliable and robust enough to be employed in around-the-clock operation.

A storage system can also be constructed of different types of storage device so that it may use them for different purposes depending on the performance, costs, and other factors, as disclosed in the Laid-open Patent Specification No. Heisei 10 (1998)-301720, which provides a means of enhancing the reliability of data stored in a storage system.

Furthermore, as disclosed in the U.S. Pat. No. 5,434,992, an arrangement can be made such that in a storage system having different areas of cache for different types of data, the cache hit ratio is improved by optimizing the allocation of such cache areas.

In selecting a volume as the destination of replication in a storage system with storage devices having different characteristics or with a dividable cache, however, none of these inventions consider how well these characteristics of the destination candidates match the characteristics of the source volume. Also, these inventions are not specifically designed to relieve the user of the burden of selecting one out of a list of possible destination volumes, which tends to grow as the capacity of the storage system grows.

SUMMARY OF THE INVENTION

It is an object of the present invention to provide a storage system that, in selecting a destination volume for data replication, takes the characteristics of the source volume into consideration.

It is another object of the present invention to provide a storage system equipped with a replication support function that allows the user to select a destination volume without being concerned with the characteristics of the source volume.

The present invention proposes three solutions: (a) the destination volume is selected by considering the type of the storage device on which the source volume resides and how the source volume is allocated to different areas of the cache; (b) the destination volume is selected by considering how the source volume is allocated to different areas of the cache; and (c) the destination volume is selected by using the criteria table that lists the selection criteria of destination volumes and how to view destination volumes according to the selection criteria.

BRIEF DESCRIPTION OF THE DRAWINGS

FIG. 2 shows an example of the storage device management table.

FIG. 3 shows an example of the LU management table.

FIG. 4 shows an example of the pair management table.

FIG. 5 shows an example of the cache group information table.

FIG. 6 shows an example of the configuration information management table.

FIG. 10 shows an example of the priority information table specifying the priority among a set of different characteristics.

FIG. 11 shows an example of the criteria table specifying how the destination volume should be selected using the sub-LU selection criteria given by the user.

DESCRIPTION OF THE PREFERRED EMBODIMENTS

Figure 1:
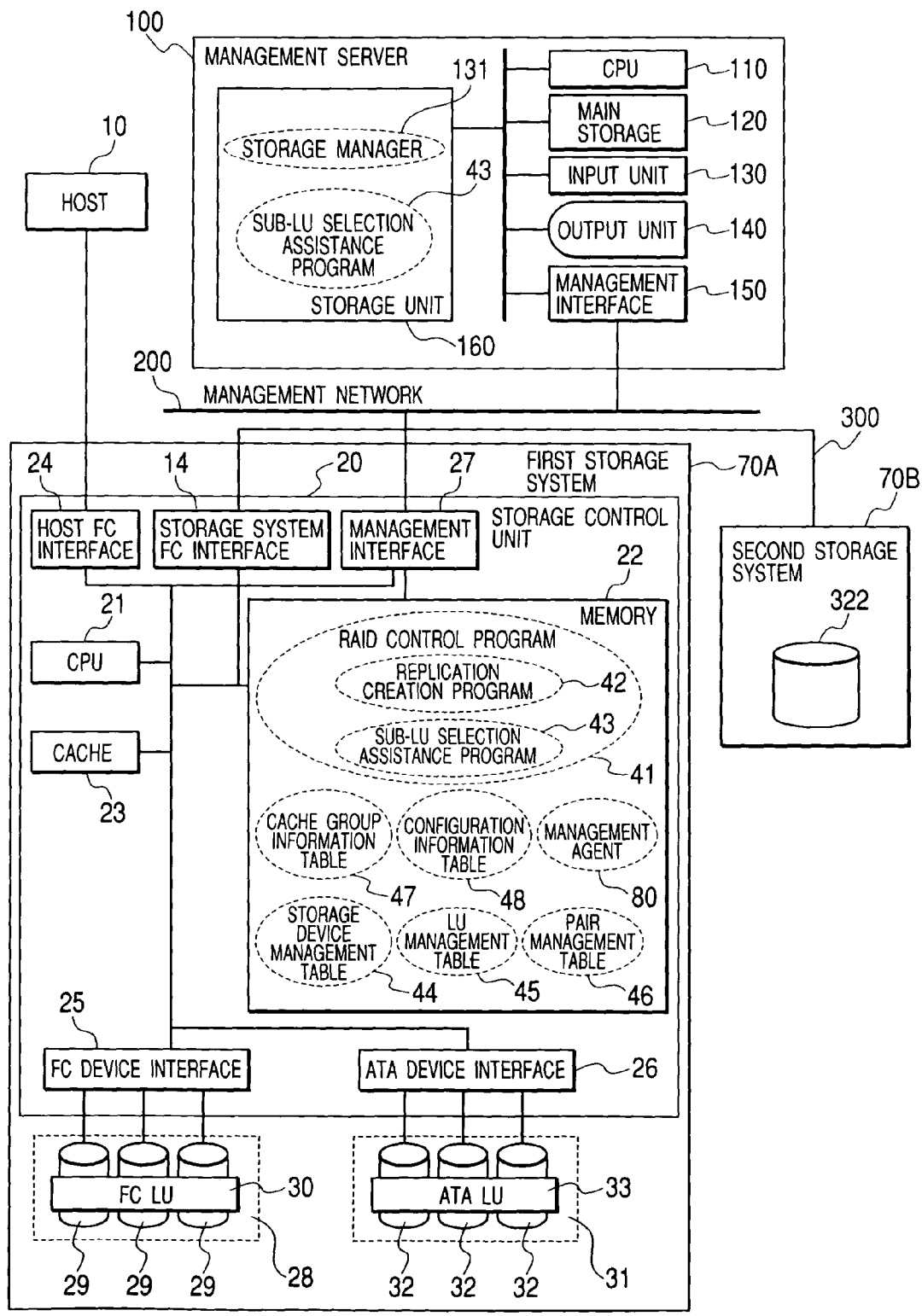
FIG. 1 illustrates the configuration of a storage system according to a preferred embodiment of the present invention.

FIG. 1 illustrates the configuration of a computer system containing a storage system that allows the user to select a destination volume by considering the characteristics of the source volume. In FIG. 1, a dotted-line ellipse denotes a program or a table of information.

A first storage system 70A is connected to a host 10, a management server 100, and a second storage system 70B of a similar configuration. An FC, SCSI, or other similar interface is used for communication between the first storage system 70A and the host 10. The first storage system 70A is connected to the management server 100 through a management network 200 and to the second storage system 70B through a communication path 300. Whereas the communication path 300 can be implemented using FC or Enterprise Systems Connection (ESCON), the present invention does not limit the choice to any of these.

The first storage system 70A comprises a storage control unit 20, a group of FC storage devices 28, and a group of ATA storage devices 31.

The storage control unit 20 comprises a CPU 21, a memory 22, a cache 23 which temporarily holds part of data received from or data to be sent to the host 10, a host FC interface 24 which carries out data transfer between the host 10 and the storage control unit 20, a storage system FC interface 14 which carries out data transfer between the network 300 and the storage control unit 20, an FC device interface 25 which carries out data transfer between the group of FC storage devices 28 and the memory 22 or the cache 21, an ATA device interface 26 which carries out data transfer between the group of ATA storage devices 31 and the memory 22 or the cache 21, and a management interface 27 which sends and receives control information to and from the management server 100, all being interconnected by an internal bus.

The FC storage device group 28 comprises one or more FC storage devices 29, whereas the ATA storage device group 31 comprises one or more ATA storage devices 32. An example of an ATA storage device is Sequential ATA (SATA) storage device. Although FC and ATA are chosen in this description of the preferred embodiment, the use of other types of storage device is not precluded.

The FC device interface 25 is connected to the FC storage device group 28 through an FC. Any protocols, such as FC arbitration loop, point-to-point, or fabric, can be employed for this interface.

The ATA device interface 26 is connected to the ATA storage device group 31 through an ATA bus.

The memory 22 contains a set of programs that are executed by the CPU 21: a Redundant Array of Inexpensive Disks (RAID) control program 41 for controlling the operation of the storage system 70A and a management agent 80 for controlling the configuration of the storage system 70A. The memory 22 also stores various management information in the form of various tables such as a storage device management table 44 which holds information on the FC storage device group 28 and the ATA storage device group 31, an LU management table 45 which holds information on logical storage areas (hereinafter abbreviated to "LUs") 30 (FC LUs) constructed on the FC storage device group 28 and logical storage areas 33 (ATA LUs) constructed on the ATA storage device group 31, a pair management table 46 which holds information on the source and destination of data replication, a cache group information table 47 used for controlling cache groups (explained later), and a configuration information table 48 used when the second storage system 70B makes its own LUs available to the storage system 70A as the latter's LUs.

In both the FC LUs 30 and the ATA LUs 33, storage areas are divided into groups by LU. A part of the cache 23 may be allocated to each such group. The term "cache group" refers to the LU group for which a part of the cache 23 is allocated.

The RAID control program 41 comprises three components (not shown in FIG. 1): a component that issues commands to the FC storage device group 28 and the ATA storage device group 31, a component that manages the FC storage device group 28 and the ATA storage device group 31, and a component that manages the LUs allocated to these storage device groups.

The RAID control program 41 contains, as subprograms, a replication creation program 42 and a sub-LU selection assistance program 43. In data replication, there are variations of report timing, such as synchronous (a report is sent to the upper equipment upon completion of the data replication) and asynchronous (a report is sent to the upper equipment without waiting for the completion of the data replication), but these variations are not distinguished here, since the present invention applies to them equally.

The management agent 80 is a program that receives data sent from the management server 100, registers and updates the information on the storage devices (storage device information) according to the input data, and sends storage device information to the management server 100.

The management server 100 comprises a CPU 110, a main storage 120, an input unit 130 (such as a keyboard), an output unit 140 (such as a display device), a management interface 150 for communication with the management network 200, and a storage unit 160, all of which are interconnected by an internal bus. The storage unit 160 stores a storage manager 131 and the sub-LU selection assistance program 43, both of which run on the CPU 110. By executing these programs, the CPU 110 collects, at regular intervals, information stored in tables 44 through 48 in the storage system 70 (70A and 70B) and produces a replication of them.

The host 10, which may be a personal computer, a workstation, or a general-purpose computer such as a mainframe, is equipped with a Host Bus Adapter (HBA) (not shown in the diagram), which is an FC interface for connection with the outside world. HBA is also given a world-wide name (WWN).

FIG. 2 shows an example of the storage device management table 44 which holds all the key information on each storage device. It is organized into several columns (fields) for each storage device (row): a storage device number column 241, a storage device type column 242, an array configuration column 243, a use column 244, and an operating status column 245.

The storage device number column 241 holds a unique identification number assigned to each storage device 29 or 32. The storage device type column 242 indicates the type of the interface employed such as FC and ATA. The array configuration column 243 contains two pieces of information for each entry: the sequence number for the RAID group (the group of storage devices put together for redundancy purposes) which the storage device belongs to and the RAID level of the group. For example, (1) RAID5' means that the storage device belongs to the first RAID group, which has a level 5 configuration. The storage system 70 can have more than one RAID group, e.g., a RAID1 RAID group and a RAID5 RAID group. A RAID group may be composed of all or some of the storage devices contained in the storage system 70.

The use column 244 indicates the use of the RAID group the storage device belongs to, e.g., DB (database) or FS (file system). The operating status column 245 indicates whether the storage device is in operating state (ON) or in stopped state (OFF).

FIG. 3 shows an example of the LU management table 45 which holds all the information needed to manage the LUs under the control of the storage control unit 20. It is organized into several columns for each LU (row): an LU number column 251, a host allocated column 252, an LUN column 253, a capacity column 254, an LU type column 255, and a paired LU number column 256. The LU number column 251 holds the identification number given to the LU. The host allocated column 252 indicates whether the LU is allocated to the host 10: "yes" if it is indeed allocated; otherwise "no". The LUN column 253 indicates the SCSI logical unit number required by the host 10 to access the LU (provided that the LU is allocated to the host 10). The capacity column 254 indicates the capacity allocated to LU. The LU type column 255 indicates the type of the LU, for example, FC or ATA. The paired LU number column 256 holds the identification number of the paired LU: if the LU is a main LU (an LU containing the original data) then its sub-LU, i.e., the LU containing the replicated data; if the LU is a sub-LU, then its main LU.

FIG. 4 shows an example of the pair management table 46, which holds information on the pairing between different LUs within the storage system 70, i.e., which LU holds a copy of which LU (a couple of LUs having this relationship is called an "LU pair"). It is organized into four columns: an LU pair number column 261, a main LU number column 262, a sub-LU number column 263, and a pairing status column 264. The LU pair number column 261 holds the unique identification number of the LU pair. The main LU number column 262 indicates the LU number assigned to the main LU, whereas the sub-LU number column 263 indicates the LU number assigned to the sub-LU. The pairing status column 264 indicates the status of the LU pair at any given point in time, such as "paired," in which synchronism is maintained between the two LUs in the LU pair and their contents match, or "split," in which synchronism is not maintained between the two LUs in the LU pair.

The storage system 70A may from time to time change the status of an LU pair from "paired" to "split." Once the status is changed in this direction, the sub-LU holds the contents of the main LU at the time of the status change (this is referred to as "taking a snapshot"). The host 10 can later save the contents of the sub-LU into another storage device or medium (such as a magnetic tape), making it a backup of the data stored in the LU pair at the time of snapshot. Alternatively, the sub-LU itself can be used as the backup.

What follows is a description of how the storage control unit 20 constructs a RAID group using the storage device management table 44 under the instructions given by the user or the system administrator.

When the storage system 70 is powered on, the CPU 21, by running the RAID control program 41, identifies all the storage devices that are connected to either the FC device interface 25 or the ATA device interface 26, and registers them in the storage device management table 44 by filling in the storage device number column 241 and the storage device type column 242. Alternatively, the user may provide the device type information via the input unit 130 in the management server 100, in which case the CPU 21 enters the provided information into the corresponding entries in the storage device type column 242.

The CPU 21 then fills in the array configuration column 243 and the use column 244 according to the commands given by the user. When the user enters the storage device number 241 and issues a command for obtaining the device type information 242 via the input unit 130, the CPU 21, by running the RAID control program 41, obtains the required information from the storage device management table 44 and sends it to the management server 100 through the management interface 27. The management server 100 then displays the received information on the output unit 140. This process may be skipped if the user is to specify the storage device type.

The user then selects a storage device based on the information displayed on the output unit 140 and enters, through an input unit 130, a command for constructing a RAID group using the selected storage device. The user also enters its intended use. The CPU 21 receives through the management interface 27 the information sent from the management server 100 about the RAID group and its use, and enters it into the corresponding entries in the array configuration column 243 and the use column 244.

FIG. 5 shows an example of the cache group information table 47 which holds information to be used by the storage system 70A in managing cache groups. It is organized into three rows: a cache group ID row 461, which lists cache groups, an allocated capacity row 462, which indicates the capacity allocated to each cache group, and an LU ID row 463, which lists the LUs belonging to each cache group. This table makes it possible to create or delete a cache group, add or delete LUs to or from a cache group, and change the capacity allocation dynamically, i.e., without halting other processing.

FIG. 6 shows an example of the configuration information table 48 which holds information on the LUs managed by the storage system 70A. It is organized into five columns: a port ID column 481, which indicates the identification number of the external interface port the LU is connected to, a WWN column 482, which corresponds to the port ID, an LUN column 483, which holds the logical unit number (LUN) of the LU, a capacity column 484, which indicates the capacity available on the LU, and a mapped LUN column 485, which holds the identification of the LU in the storage system 70B to which the LU in this entry is mapped. The LUs appearing in this column belong to the storage system 70B; all the other LUs belong to the storage system 70A.

By using the configuration information table 48, the storage system 70A makes the LUs in the storage system 70B accessible to the host 10 as if they belonged to itself. In other words, the host 10 can send to the storage system 70A data input/output commands directed to LUs in the storage system 70B.

Figure 8:
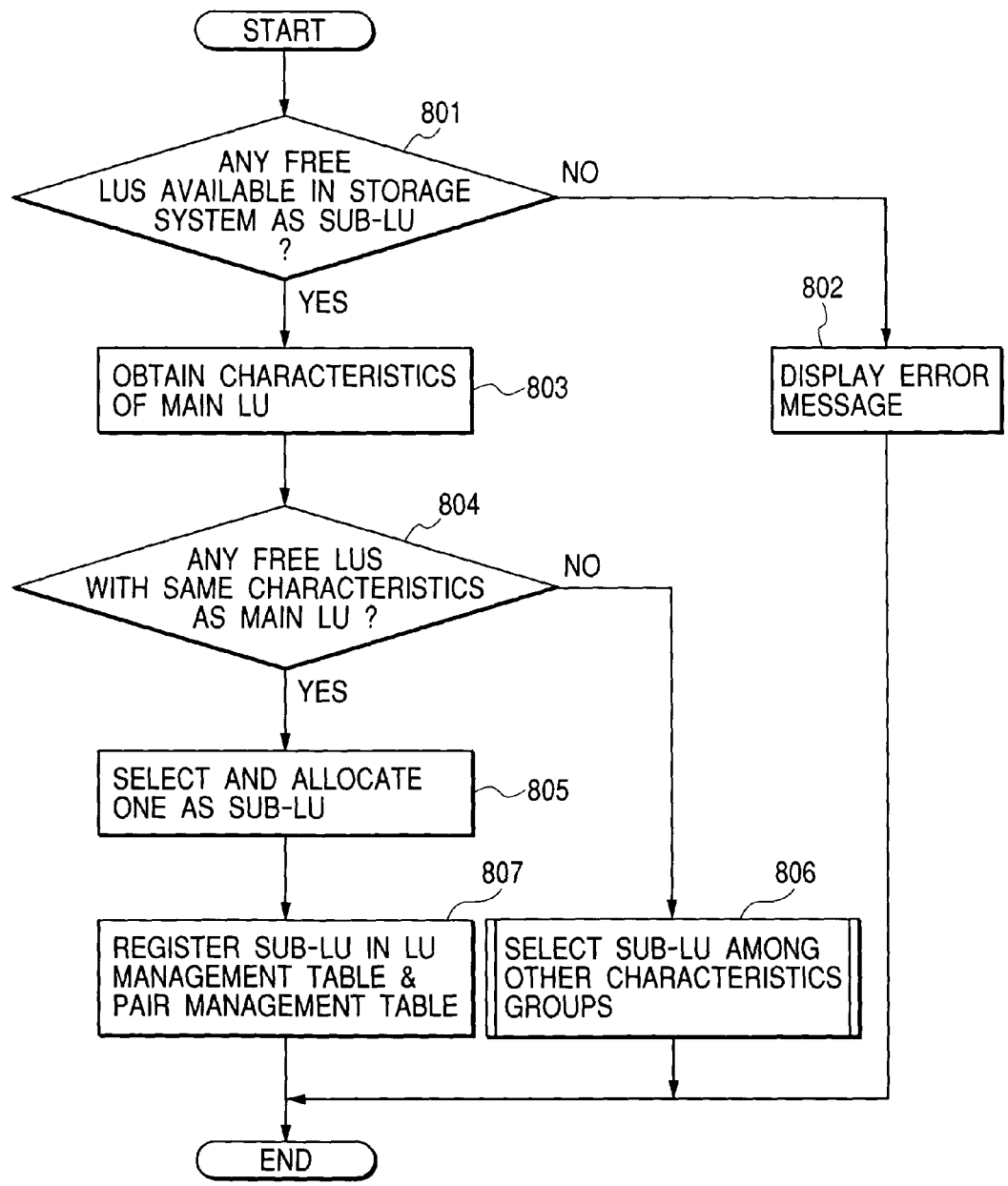
FIG. 8 illustrates the process flow of automatically selecting a sub-LU.

FIG. 8 shows the process flow of automatically selecting the sub-LU that best matches the main LU (with no conditions specified for selection).

The CPU 21 determines whether, within the group of LUs allocated to the host 10 that creates replications, there are any free LUs that may be considered as a sub-LU for the given LU (step 801). If there is none, the CPU 21 sends a message to that effect to the output unit 140 (step 802) and terminates the processing. If any free LUs are found, the CPU 21 obtains the characteristics of the main LU from the storage device management table 44 and the LU management table 45 (step 803). It then checks to see if there are any free LUs in the group of LUs having the same characteristics (hereinafter called the "characteristics group") as the main LU (step 804). If there are any, it then selects one at random and allocates it as a sub-LU (step 805). An example of the characteristic is the storage device type (FC or ATA), so that the search is made among the group of storage devices of the same type as the main LU's. Another example is the cache group, so that the search is made among the group of LUs belonging to the same cache group as the main LU's. A third example is the storage control unit, so that the search is made among the group of LUs belonging to the storage control unit 20 that controls the main LU. A still another example is a combination of multiple characteristics, so that the search is made among the group of LUs having the same characteristics in all respects.

Once a sub-LU is selected in step 805, the CPU 21 registers it in the LU management table 45 and the pair management table 46 (step 807).

If no free LUs meeting the requirements are found in step 804, the CPU 21 proceeds to step 806 to make a selection among other characteristics groups.

Figure 9:
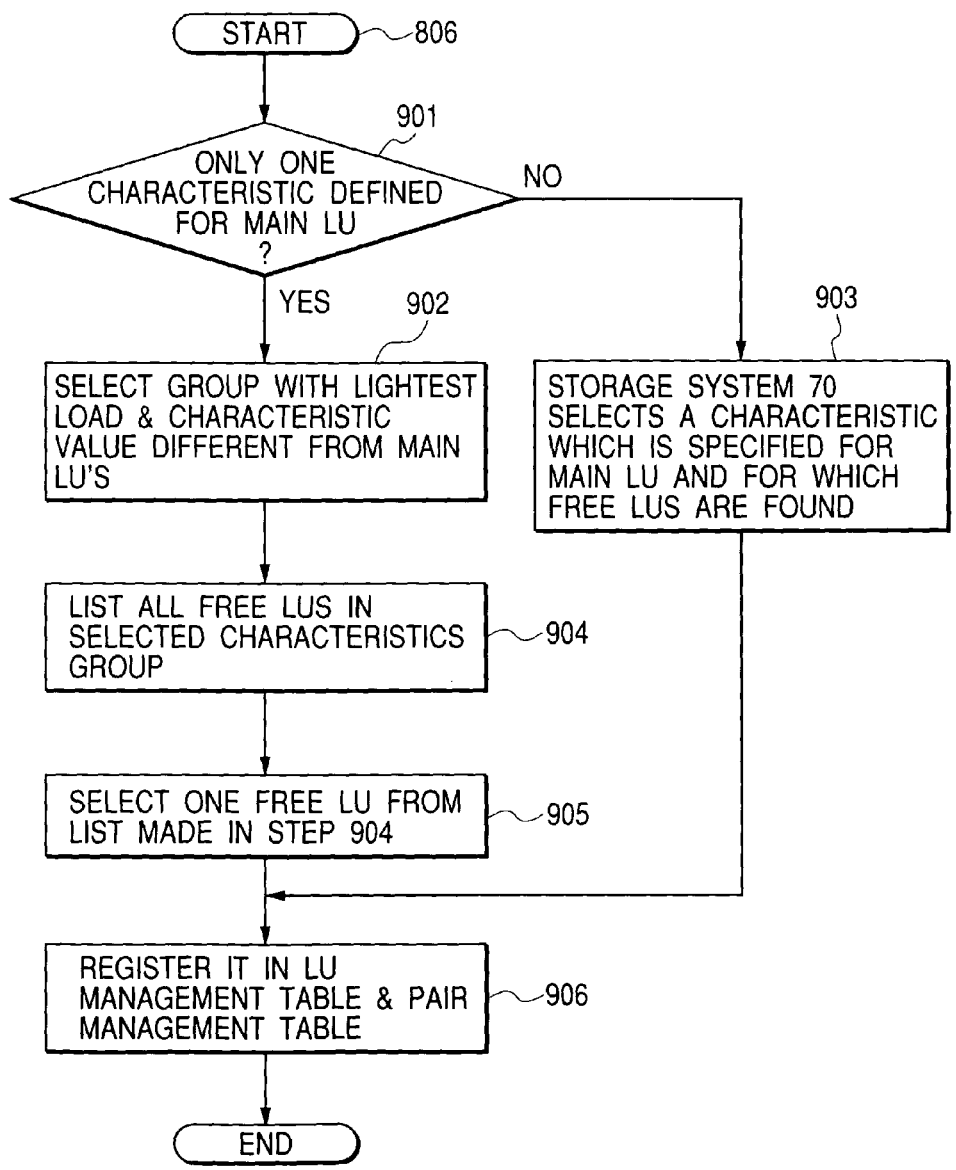
FIG. 9 illustrates the process flow of selecting a sub-LU from a different characteristics group.

FIG. 9 illustrates the detailed flow of step 806 in FIG. 8.

The CPU 21 first checks whether there is only one characteristic specified for the main LU (step 901). If there is indeed only one, then it selects a sub-LU among the characteristics group(s) having characteristic values different from the main LU. For example, if the main LU is an FC storage device, then the selection is made among the group of storage devices other than FC devices (such as ATA). If there is more than one characteristics group that have characteristics different from the main LU's, then the selection is made among the group that has a free LU and has a light load (step 902). A characteristics group is considered to have a light load if few replications have been made within it. The CPU 21 then makes a list of all the free LUs in the selected characteristics group (step 904) and selects one as the sub-LU at random among this list (step 905). It then registers it in the LU management table 45 and the pair management table 46 (step 906). If step 901 reveals that more than one characteristic is specified for the main LU, the storage system 70 selects at random one characteristic which is specified for the main LU and for which free LUs are found (step 903). For example, if the storage device type and the cache division unit are specified for the main LU and no free LUs have been found that meet both characteristics, then the search is made among the group of the same storage device type but with a different cache division unit. If there is more than one group having a different cache division unit, then the search is made among the group with the lightest load as in step 902.

What follows now is a description of how the user specifies the conditions for selecting a sub-LU.

FIG. 10 shows an example of the priority information table 1300 listing the priority among a set of different characteristics as specified by the user. This table is stored in the memory 22. The CPU 21 selects a characteristics group considering the priority specified in this table. In other words, the storage system 70 determines whether a sub-LU should be selected among a group which is of the same storage device type but has a different cache division unit or a group which is of a different storage device type but has the same cache division unit. Alternatively, the user may directly specify the selection criteria. For example, if the user requests that the speed of replication be given priority, then a free LU will be selected from the group having the same cache division unit as the main LU's. If the user wants to prevent the replication of the sub-LU from slowing down the I/O processing by the main LU, he/she can have a free LU selected from a group having a cache division unit different from the main LU's.

If there is no preference given by the user, then the storage system 70 selects a sub-LU according to the priority specified in this table. In this example, the hard disk device type 1301 is given the highest priority. Hence, the search is made among a group of storage devices of the same type (FC or ATA) as the main LU's. Then the characteristic that is next in priority is picked as the selection criterion. In this example, a selection is to be made among a group of LUs having the same cache division unit as the main LU's. If there is none, then LUs in other groups are considered. Next, the characteristic that is one level below in priority is picked as the selection criterion. In this example, that is the first storage system, which is specified in the storage system number entry 1303. If there are no free LUs in the first storage system, then the second storage system will be searched. The characteristics and priority mentioned here are just arbitrary examples, and a different set of characteristics and priority may be employed. A variation of the present invention would be to allow the user to specify the characteristics and selection criteria. Such a scheme can also be used in step 903 in FIG. 9 as an alternative selection method in case there is more than one characteristic involved.

FIG. 11 shows an example of the criteria table 1400 stored in the memory 22 that specifies how the destination volume should be selected using the sub-LU selection criteria given by the user. More specifically, it lists the selection criteria 1401 given by the user and the selection algorithm 1402 for each such criterion. For example, if the user specifies "reliability," then the CPU 21, by referencing the selection algorithm column 1402, determines that the selection should be made among FC storage devices. If there are no free LUs among FC storage devices, then storage devices of other types should be considered. If the user specifies "Backup" and "Number of copies: 7," then the selection should be made among ATA storage devices, according to the selection algorithm column 1402.

Upon selecting a sub-LU, The CPU 21 registers it in the pair management table 46 by making a new entry and entering the parameters specified by the user as well as the identification of the sub-LU.

In this manner, the user can, by simply specifying a main LU, have the storage system select an optimum sub-LU and create a pair. Whereas in the example described here only one sub-LU is selected, it is also possible to select multiple sub-LUs, show them to the user, and have the user make the final selection.

Figure 12:
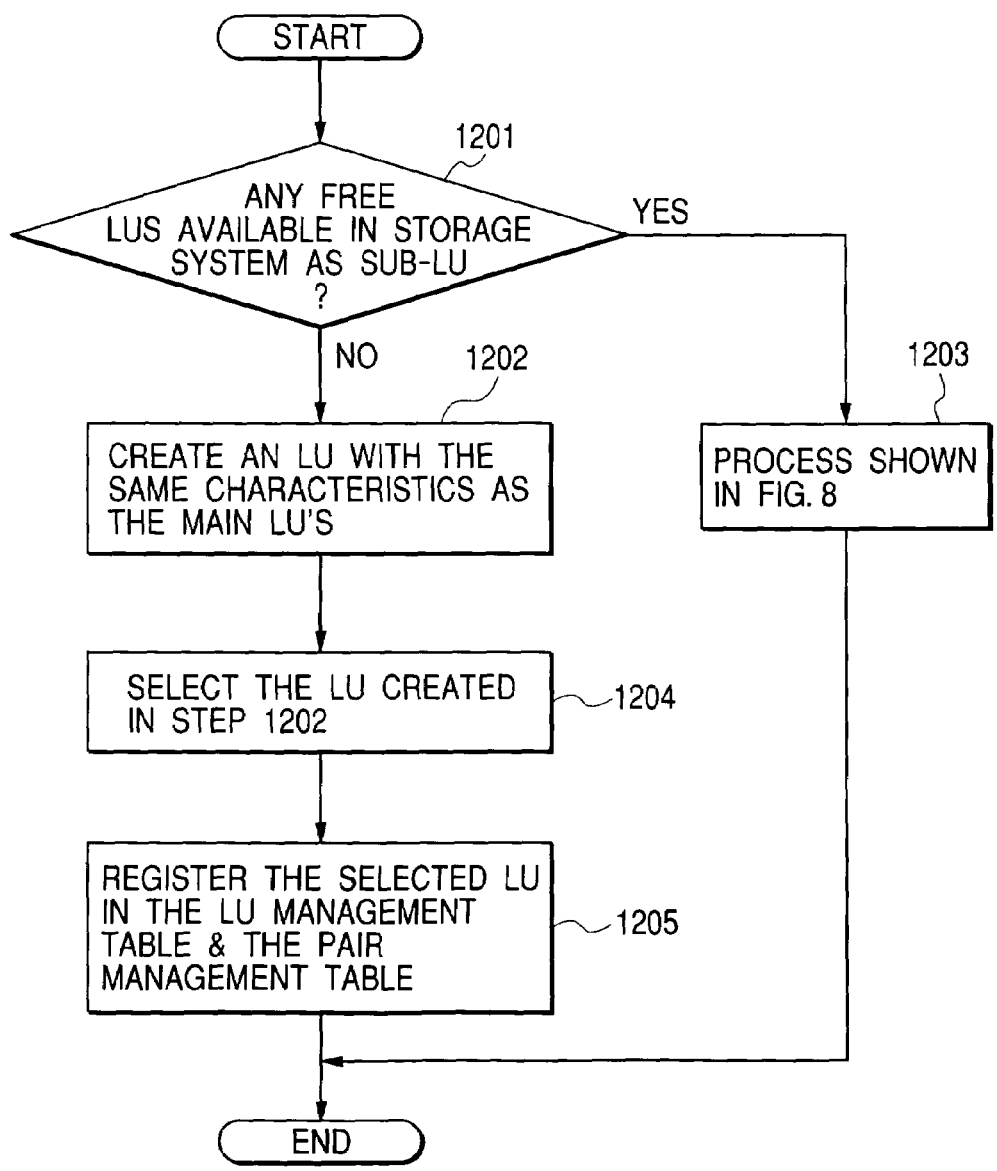
FIG. 12 illustrates the process flow of creating an LU and registering it as a sub-LU.

In the example described above, sub-LUs are selected among the LUs that already exist in the system. As an alternative, if there are no free LUs in the host requesting replication, a sub-LU can be created and then allocated, as shown in FIG. 12.

As in step 801 in FIG. 8, the CPU 21 determines whether, within the group of LUs allocated to the host 10 that creates replications, there are any free LUs that may be considered as a sub-LU for the specified LU (step 1201). If there are any, it carries out the same process as the one shown in FIG. 8 (more specifically, from step 803 on) (step 1203). If there is none, it obtains the characteristics of the main LU and creates an LU of the same device type as the main LU's. For example, if the main LU is constructed on a group of FC storage devices, a new LU is created on a group of FC storage devices with a parity group, and this new LU is allocated to the host (step 1202). This newly created LU is then selected as a sub-LU (step 1204), and registered in the LU management table 45 and the pair management table 46 (step 1205), in the same manner as in step 807 in FIG. 8.

Figure 7:
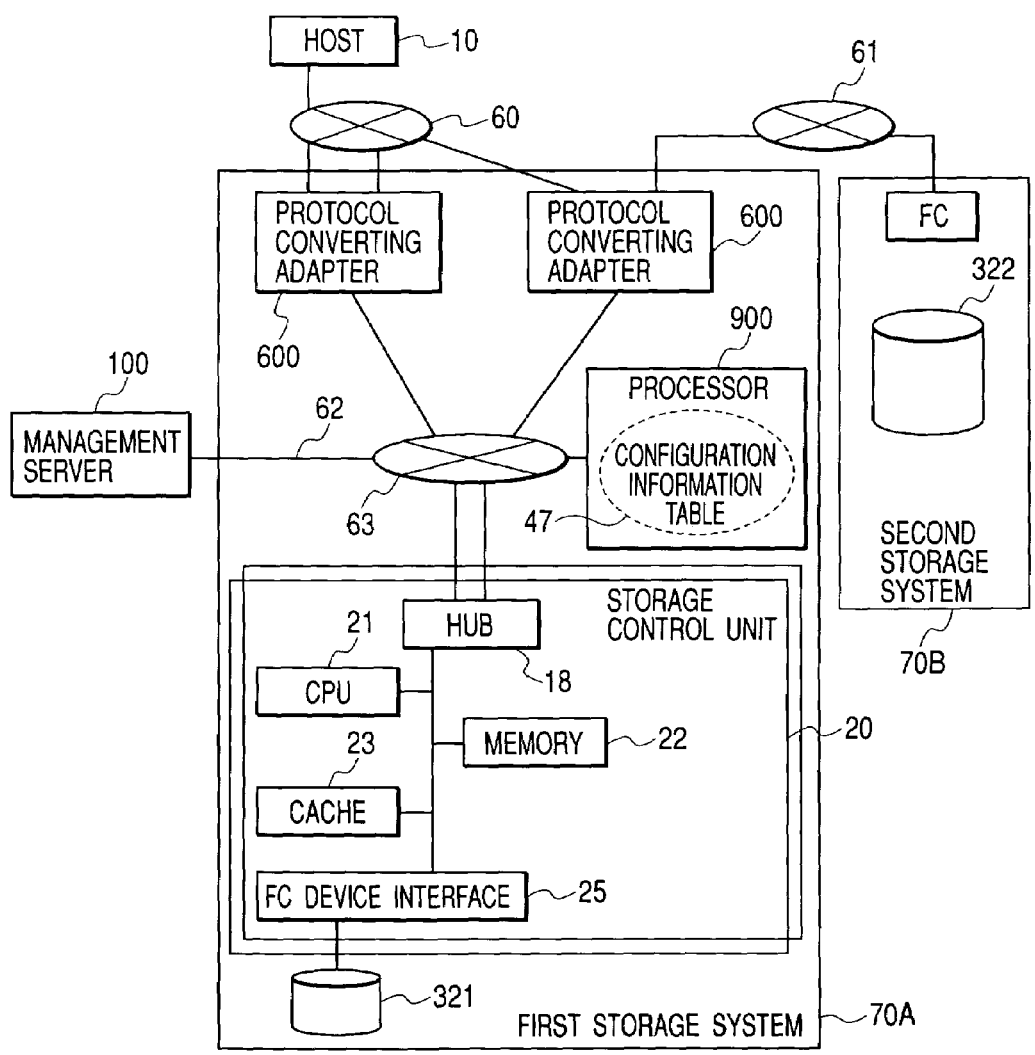
FIG. 7 illustrates the configuration of a storage system according to another preferred embodiment of the present invention.

As another embodiment of the present invention, FIG. 7 illustrates an example of the storage system 70A provided with one or more protocol converting adapters 600. The first storage system 70A is connected to the second storage system 70B through a network 61. Alternatively, a similar configuration without the network 61 and the second storage system 70B can be thought of. The protocol converting adapter 600 is a unit for channel connection that is independent of the storage control unit 20 and handles protocols conforming to local area network (LAN), switched line, leased line, ESCON, and other standards. One or more protocol converting adapters 600 are connected to one or more storage control units 20 through a network 63.

Upon receiving an input/output command from the host 10, the protocol converting adapter 600 deciphers it, performs a protocol conversion, determines whether the LU holding the requested data belongs to the storage control unit 20 or is located in the second storage system 70B, and forwards the command to the appropriate destination. It determines where the desired LU is located by referencing the configuration information table 48 stored in the memory in the processor 900, which is also connected to the network 63. Upon receiving the command, the storage control unit 20 calls the sub-LU selection assistance program 43.

The management server 100 recognizes the first storage system 70A through the network 62. Alternatively, the management server 100 may be directly connected to the first storage system 70A using a dedicated path.

The storage media used in the storage devices in the foregoing descriptions may take a variety of forms, such as magnetic media and optical media. The programs mentioned in the foregoing descriptions may be loaded into the system from a storage medium such as a CD-ROM or may be downloaded from another piece of equipment through a network.

The present invention thus realizes a storage system in which, in replicating the contents of a storage volume, a destination volume or a storage device or a group of storage devices on which it is to be created can be selected by considering the characteristics of the source volume and/or the storage devices on which the source volume resides. It also provides a storage system with a replication assistance capability that allows the user to select a destination volume without being concerned with the volume or device characteristics, thus reducing the user's burden.

What we claim is:

1. A network-connected storage system comprising a first group of storage devices on which logical storage areas are constructed, a second group of storage devices on which logical storage areas are constructed, and a storage control unit for controlling the first and second groups of storage devices, the storage control unit comprising:

a first interface for connecting the first group of storage devices;

a second interface for connecting the second group of storage devices;

a memory holding a first set of information on the characteristics, including the type of the interface with the storage control unit, of the first and second groups of storage devices and a second set of information on the logical storage areas constructed on the first and second groups of storage devices;

a means of referencing the first and second sets of information in the memory in selecting a logical storage area into which the contents of a specified logical storage area constructed on the first or second group of storage devices are to be replicated;

a means of checking whether free logical storage areas are available on a group of storage devices having the same interface as the first or second interface, based on the results of referencing the first and second sets of information using the means of referencing; and a means of securing, in the free logical area found to be available using the means of checking such availability, an area for storing a replication of the contents of the specified logical storage area in the first or second group of storage devices.

2. The network-connected storage system of claim 1, wherein the memory further holds a first table holding, for each storage device, information on the type of its interface and the type of RAID defined on it and a second table holding, for each logical storage area, information on the characteristics of logical groups constructed on the first or second group of storage devices corresponding to it.

3. The network-connected storage system of claim 2, wherein the memory further holds a third table holding information on pairs of source and destination logical storage areas and a means is provided of registering in the third table the pair of the specified source storage area and its corresponding destination logical storage area secured using the means of securing.

4. The network-connected storage system of claim 1, further comprising a cache that temporarily holds part of information stored in a logical storage area defined on the first or second group of storage devices and a means of determining whether the unit of dividing the cache matches the characteristics of the first or second group of storage devices.

5. The networked storage system of claim 2, the memory further holding a table holding the selection priority among a plurality of characteristics of each storage device, wherein the means of checking the availability of free storage areas carries out the checking according to the selection priority registered in the table.

6. A volume management method for managing data replication in a storage system comprising a first group of storage devices which are connected through a first interface and on which logical storage areas are constructed, a second group of storage devices which are connected through a second interface and on which logical storage areas are constructed, and a storage control unit that controls the first and second groups of storage devices through the first and second interfaces and is equipped with a memory, the volume management method comprising:

storing in the memory the information on the characteristics, including the type of interface, of the first and second groups of storage devices and the information on the characteristics of volumes constructed on the first or second group of storage devices;

referencing the information stored in the memory in selecting a destination volume for a specified volume constructed on the first or second group of storage devices;

checking, using the result obtained in the referencing step, whether free volumes are available among the volumes constructed on a group of storage devices having the same interface as the first or second interface; and securing, if the checking has proved positive, an area, in the free volume found in the checking step, for creating a replication of the contents of the specified volume constructed on the first or second group of storage devices.

7. The volume management method of claim 6, further comprising the step of registering the pair of the source volume and the secured destination volume in the memory.

8. The volume management method of claim 6, further comprising the step of, if the checking has proved negative, creating a volume having the same characteristics as the source volume on a storage device having the same characteristics as the first or second group of storage devices on which the source volume is constructed, and the step of registering in the memory the volume thus created as the destination volume.

* * * * *